MULTIPROCESSOR DIGITAL COMPUTER SYSTEM WITH ADDRESS MODIFICATION DURING PROGRAM EXECUTION

Filed Oct. 11, 1967

INVENTOR.
ERWIN A. HAUCK
JACOB F. VIGIL
BY
Christie, Parker & Hale
ATTORNEYS 3,555,513

MULTIPROCESSOR DIGITAL COMPUTER SYSTEM WITH ADDRESS MODIFICATION DURING PROGRAM EXECUTION

Erwin A. Hauck, Arcadia, and Jacob F. Vigil, West Covina, Calif., assignors to Burroughs Corporation, Detroit, Mich., a corporation of Michigan Filed Oct. 11, 1967, Ser. No. 674,451
Int. Cl. G06f *15/16, 15/40*
U.S. Cl. 340—172.5 11 Claims

ABSTRACT OF THE DISCLOSURE

An addressable memory unit is shared by two processors, each including a source of memory addresses. The memory address values in the first and second processors are at least in part the same. In the course of the operation of the processors, the address values are coupled to the memory unit. The address values from one of the processors are modified by one constant amount and the address values from the other processor are modified by another constant amount to produce mutually exclusive address values. Preferably, the modified address values are compared with a limit value prior to the initiation of the memory read-write cycle. Most advantageously, the memory unit is divided into modules assigned to one or the other of the processors and only the portion of the memory address values designating the module are modified.

BACKGROUND OF THE INVENTION

This invention relates to data processing and, more particularly, to a digital computer in which a single memory unit is shared by a plurality of processors.

In some situations, it is desirable to organize a digital computer such that two or more processors share a single memory unit. For one thing, such an organization enhances the reliability of the computer operations because one of the processors can continue operations after the other processor has malfunctioned. For another thing, the available space in the memory unit can be temporarily assigned to serve either processor, depending upon the demands imposed by the program the processor is then executing. If the space in the memory unit is assigned to one of the processors after its program is already established, the entire program must be reviewed to update the memory address values so they conform to the memory unit assignment. Programming techniques have been devised to accomplish this review of memory space allocation. Some prior art machines store in memory a special supervisory program which directs the operation of the machine while the execution of object programs has been interrupted. When the supervisory program becomes active, it can cause the processor to execute a series of steps so as to update memory address values. However, the execution of such steps consumes time which would be more efficiently used in executing the object programs.

SUMMARY OF THE INVENTION

In a computer having an addressable memory unit shared by a plurality of processors, the invention contemplates the modification of the memory address values from the processors by different, constant amounts to produce address values for the processors that are mutually exclusive from one another. More particularly, each processor has a source of memory addresses associated with the program it is executing. In the course of operation of the processors, the memory addresses are coupled to the memory unit. As the memory addresses are coupled to the memory unit, the memory address values from each processor are modified by a constant amount.

Thus, each processor accesses the portion of the memory unit assigned to it, with the result that the processors are able to function independently of one another if desired.

According to a feature of the invention, the modified address values are checked against a limit value prior to the initiation of the read-write memory cycles in which these address values are utilized.

Most advantageously, the memory unit comprises a plurality of modules each exclusively assigned to one processor. In coupling the memory address values to the memory unit, only the portion of the address designating the module is modified. The portion of the address designating the memory cell within the module, therefore, always remains the same.

BRIEF DESCRIPTION OF THE DRAWING

The features of a specific embodiment of the invention are illustrated in the drawing, in which.

DESCRIPTION OF A SPECIFIC EMBODIMENT

Figure 1:
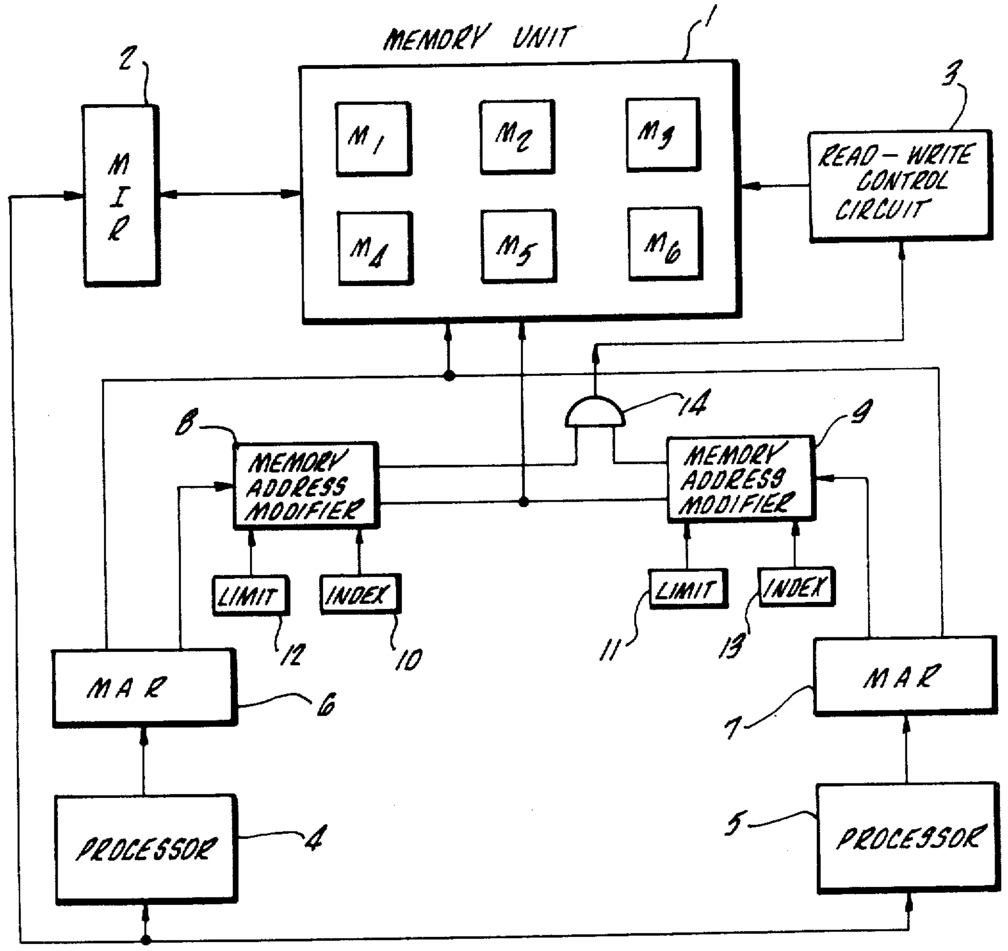
FIG. 1 is a schematic block diagram of a digital computer embodying the principles of the invention.

In FIG. 1, an addressable memory unit 1 is shown with memory modules $M_1$, $M_2$, $M_3$, $M_4$, $M_5$, and $M_6$. The transfer of information between memory unit 1 and a memory information register 2 is regulated by a read-write control circuit 3. Processors 4 and 5 share memory unit 1 in the course of their operations. Memory address registers 6 and 7 are provided for processors 4 and 5, respectively. The memory address values for memory unit 1 each comprise a portion that designates one of the modules $M_1$ through $M_6$ and a portion that designates one of the memory cells within a module. The cell designating portion of the memory address is directly coupled from memory address registers 6 and 7 to memory unit 1. The module designating portion of the memory address is indirectly coupled from memory address registers 6 and 7 to memory unit 1 through memory address modifiers 8 and 9, respectively. The module designating portion of the memory address values from memory address register 6 is altered in memory address modifier 8 by a constant amount determined by the value stored in an index register 10. The module designating portion of the memory address values from memory address register 7 is altered in memory address modifier 9 by a different constant amount determined by the value stored in an index register 13. Registers 10 and 13 have the same number of bit positions as the module designating portion of the memory addresses. The module designating portions of the altered memory addresses formed by memory address modifiers 8 and 9 are checked against limit values stored in limit registers 12 and 11, respectively. The index values stored in registers 10 and 13 and the limit values stored in registers 11 and 12 could be established by toggle switches manually set by the programmer at the time the assignment of memory modules is made. As long as the altered memory addresses do not exceed their respective limit values, memory address modifiers 8 and 9 transmit an enabling signal through an AND gate 14 to read-write control circuit 3. When an altered memory address exceeds the limit stored in register 12 or register 11, an enabling signal is no longer produced by the corresponding memory address modifier so an enabling signal ceases to be transmitted to control circuit 3 and the read-write cycle of memory unit 1 is inhibited.

Figure 2:
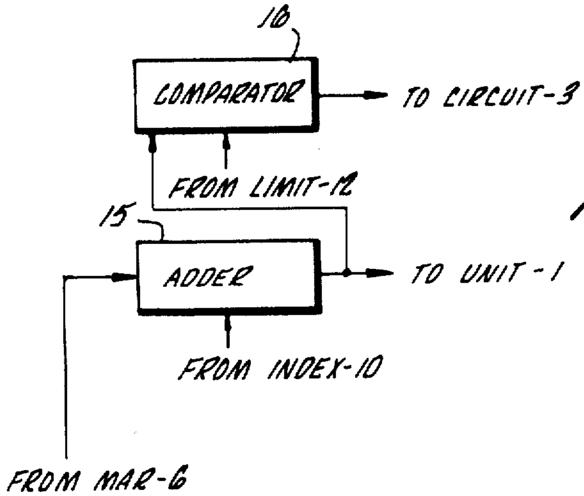
FIG. 2 is a schematic block diagram of one of the memory address modifiers of FIG. 1.

Memory address modifier 8 is shown in more detail in FIG. 2. Memory address modifier 9 could be similarly constructed. The module designating portion of each memory address value and the index value stored in register 10 are coupled to an adder 15 and the sum thereof is transmitted to memory unit 1, thereby designating the module to be addressed. This sum and the limit value stored in register 12 are coupled to a comparator 16 that has an output remaining energized as long as the limit value is equal to or larger than the module designating portion of the memory address value and becomes deenergized when the limit is exceeded.

For the purpose of explaining the invention, it is assumed that in initially compiling the programs processors 4 and 5 are to execute, the memory addresses are formed as though processor 4 were to operate with modules $M_1$, $M_2$, and $M_3$ and as though processor 5 were to operate with module $M_1$. It is further assumed that later when the programs are actually run, modules $M_2$, $M_3$, and $M_4$ are assigned to operate with processor 4, module $M_5$ is assigned to operate with processor 5, and modules $M_1$ and $M_6$ are unavailable to processors 4 and 5 because they are storing information associated with another program. Since modules $M_2$, $M_3$, and $M_4$ are in actuality assigned to processor 4, an index value of one is set up in register 10. Similarly, since module $M_5$ is in actuality assigned to processor 5, an index value of four is set up in register 13. Thus, if processor 4 transfers to memory address register 6 a memory address value whose module designating portion is one, designating module $M_1$, this portion is added to the index value one in memory address modifier 8 so the absolute address actually applied to memory unit 1 designates module $M_2$. At the same time, the portion of the memory address value in register 6 designating the particular cell in the module is directly applied to memory unit 1. In a read operation, for example, the information in the designated cell of module $M_2$ is transferred under the control of circuit 3 through memory information register 2 to processor 4 where it is operated upon. Similarly, if a memory address value, having a module designating portion of one, is transferred from processor 5 to memory address register 7, it is added to the index value four in memory address modifier 9 and the absolute address applied to memory unit 1 designates module $M_5$.

Each altered module designating portion formed by memory address modifier 8 is compared with the limit value four set up in register 12 and each module designating portion formed by memory address modifier 9 is compared with the limit value five set up in register 11. Any time the altered module designating portion of an address value exceeds its limit value, the operation of read-write control circuit 3 is inhibited.

By assigning the modules of memory unit 1 to processors 4 and 5 on a mutually exclusive basis, processors 4 and 5 are permitted to operate independently of one another. The invention could also function in a situation where one or more of the modules of memory unit 1 are shared by processors 4 and 5. In such case, the operation of the processors would be dependent.

To reassign the modules of memory unit 1 differently to processors 4 and 5, it is not necessary to disturb the compiled programs. The reassignment is effected by the simple expedient of setting up different index values in registers 10 and 13 and different limit values in registers 12 and 11.

What is claimed is:

1. A digital computer system comprising:
   an addressable memory unit having a plurality of cells;
   a first processor including a source of memory addresses;
   a second processor including a source of memory addresses;
   means for coupling memory addresses from the first processor to the memory unit to access the cells of the memory unit designated by the coupled addresses;
   means operative during execution of a program by the second processor for arithmetically modifying every value of the memory address from the second processor by a constant amount; and
   means for coupling the modified addresses from the second processor to the memory unit to access the cells of the memory unit designated by the modified addresses.

2. The computer system of claim 1, in which the means for coupling addresses from the first processor of the memory unit arithmetically modifies the value of every address by a constant amount during the execution of a program by the first processor to access the cells of the memory unit designated by the modified addresses.

3. The computer system of claim 1, in which the memory addresses of the first and second processors are at least in part the same and the constant amount by which the addresses from the second processor are modified is such that the modified addresses of the second processor and the addresses of the first processor coupled to the memory unit are mutually exclusive.

4. The computer system of claim 1 comprising in addition:
   means for storing a limit value;
   means responsive to the limit value and the modified memory addresses from the second processor for generating a control signal which indicates that the modified address value exceeds the limit value; and
   means responsive to the control signal to inhibit the exchange of information with the memory unit when the control signal so indicates.

5. The computer system of calim 1, in which the addressable memory unit comprises a plurality of modules, the memory addresses each have a first portion designating a module and a second portion designating a cell within the designated module, and the means for arithmetically modifying the value of the memory addresses from the second processor modify only the first portion of the memory address.

6. A digital computer system comprising:
   an addressable memory unit;
   a first information processor with a source of memory addresses;
   a second information processor with a source of memory addresses coinciding at least in part with the memory addresses of the first processor;
   means operative during the execution of a program by the first information processor or arithmetically altering every memory address of the first processor by a constant first amount;
   means operative during the execution of a program by the second information processor for arithmetically altering every memory address of the second processor by a constant second amount of such value as to derive addresses mutually exclusive from the altered address of the first processor; and
   means for coupling the modified addresses to the memory unit to gain access to the areas of the memory unit designated by the addresses.

7. The computer system of claim 6, in which the memory unit comprises a plurality of memory modules, the memory addresses have a first portion that designates the memory module and a second portion that designates a cell within a memory module, the means for arithmetically altering the memory addresses of the first processor alter the first portion of the memory addresses of the first processor by the constant first amount, and the means for arithmetically altering the memory addresses of the second processor alter the first portion of the memory addresses of the second processor by the constant second amount.

8. The computer system of claim 7, comprising in addition:
   a read-write control circuit for regulating the exchange of information with the memory unit, the read-write circuit being subject to control by an enabling signal;

means for storing a first limit value and a second limit value;

means for comprising the altered addresses from the first processor with the first limit value and the altered addresses from the second processor with the second limit value; and means for generating an enabling signal for the read-write control circuit as long as the altered addresses fail to exceed their corresponding limit values.

9. A digital computer system comprising:

an addressable computer memory unit having a plurality of modules, the addresses for accessing the memory unit each having a first portion designating a module and a second portion designating a cell within a module;

a processor having a source of memory addresses;

means for coupling the first portion of each address furnished by the processor to the memory unit through modifying circuitry that arithmetically alters the value of the first portion by a constant amount; and means for directly coupling the second portion of each address furnished by the processor to the memory unit.

10. The computer system of claim 9 comprising in addition:

means for storing a limit value;

means for comparing the altered addresses with the stored limit value and for inhibiting the exchange of information with the memory unit when an altered address exceeds the limit value.

11. A digital computer system comprising:

an addressable memory unit;

a processor with a source of memory addresses;

means operative during the execution of a program by the processor for arithmetically modifying the value of every memory address from the processor by a constant amount;

means for coupling the modified memory address to the memory unit;

means responsive to a read-write control circuit for exchanging information with the portion of the memory unit designated by a modified address; and means for inhibiting the read-write control circuit when a modified address exceeds a limit value.

References Cited

UNITED STATES PATENTS

| | | | |
|---|---|---|---|
| 3,317,898 | 5/1967 | Hellerman | 340—172.5 |
| 3,341,817 | 9/1967 | Smeltzer | 340—172.5 |
| 3,319,226 | 5/1967 | Mott et al. | 340—172.5 |
| 3,419,849 | 12/1968 | Anderson et al. | 340—172.5 |

PAUL J. HENON, Primary Examiner

M. B. CHAPNICK, Assistant Examiner

PO-1050
(5/69)

UNITED STATES PATENT OFFICE
CERTIFICATE OF CORRECTION

Patent No. 3,555,513 Dated January 12, 1971

Inventor(s) Erwin A. Hauck, Jacob F. Vigil

It is certified that error appears in the above-identified patent and that said Letters Patent are hereby corrected as shown below:

IN THE SPECIFICATION:

Column 2, line 34, delete "the"

IN THE CLAIMS:

Column 3, line 75, "every" should be --the--

Column 4, line 1, "the memory" should be --every memory-- line 8, "of" should be --to-- line 30, "calim" should be --claim-- line 46, "or" should be --for-- line 54, "address" should be --addresses--

Column 5, line 5, "comprising" should be --comparing--

Signed and sealed this 19th day of October 1971.

(SEAL)
Attest:

EDWARD M.FLETCHER,JR.
Attesting Officer

ROBERT GOTTSCHALK
Acting Commissioner of Patents